(12) United States Patent
Lodolo

(10) Patent No.: US 8,297,587 B2
(45) Date of Patent: Oct. 30, 2012

(54) MULTIFUNCTIONAL SHUT-OFF DEVICE

(76) Inventor: Alberto Lodolo, Genoa (IT)

( * ) Notice: Subject to any disclaimer, the term of this patent is extended or adjusted under 35 U.S.C. 154(b) by 892 days.

(21) Appl. No.: 12/279,658

(22) PCT Filed: Jan. 29, 2007

(86) PCT No.: PCT/EP2007/050821
§ 371 (c)(1),
(2), (4) Date: Oct. 21, 2008

(87) PCT Pub. No.: WO2007/093492
PCT Pub. Date: Aug. 23, 2007

(65) Prior Publication Data
US 2009/0095362 A1 Apr. 16, 2009

(30) Foreign Application Priority Data

Feb. 17, 2006 (IT) .................................. MI06A0296

(51) Int. Cl.
*F16K 47/00* (2006.01)
(52) U.S. Cl. .................. 251/118; 251/148; 285/367
(58) Field of Classification Search .......... 251/118–127, 251/148, 154, 155, 285, 331; 137/551; 138/43–46; 73/861.79–861.94; 285/364
See application file for complete search history.

(56) References Cited

U.S. PATENT DOCUMENTS

| 542,798 | A | * | 7/1895 | Curlett | 251/155 |
|---|---|---|---|---|---|
| 1,462,413 | A | * | 7/1923 | Kersten | 366/181.5 |
| 2,071,004 | A | * | 2/1937 | Shanley | 137/216 |
| 2,323,839 | A | * | 7/1943 | Nixon | 137/492.5 |
| 2,454,929 | A | * | 11/1948 | Kempton | 138/45 |
| 2,589,888 | A | * | 3/1952 | Stampfl | 138/45 |
| 2,709,566 | A | * | 5/1955 | Davis | 251/148 |
| 2,830,617 | A | * | 4/1958 | Brown | 137/553 |
| 3,102,555 | A | * | 9/1963 | Botkin | 137/630.15 |
| 3,488,824 | A | * | 1/1970 | Boteler | 29/890.124 |
| 3,593,575 | A | * | 7/1971 | Thieme | 73/199 |
| 3,665,946 | A | * | 5/1972 | Robinson | 137/68.14 |
| 3,693,443 | A | * | 9/1972 | Willett et al. | 73/861.87 |
| 3,697,002 | A | * | 10/1972 | Parkison | 239/533.14 |
| 3,782,683 | A | * | 1/1974 | Lee et al. | 251/148 |
| 3,837,363 | A | * | 9/1974 | Meronek | 138/45 |
| 4,248,270 | A | | 2/1981 | Ostrowski | |
| 4,552,183 | A | * | 11/1985 | Chick | 138/99 |
| 4,874,007 | A | * | 10/1989 | Taylor | 137/312 |
| 4,971,117 | A | * | 11/1990 | Hendrickson | 138/41 |

(Continued)

FOREIGN PATENT DOCUMENTS

EP 0 043 255 1/1982

(Continued)

*Primary Examiner* — John Rivell
*Assistant Examiner* — Matthew W Jellett
(74) *Attorney, Agent, or Firm* — Oblon, Spivak, McClelland, Maier & Neustadt, L.L.P.

(57) ABSTRACT

A multifunctional fluid shut-off device including an upstream shut-off element, a flow-rate limiter, and a downstream functional element. The upstream shut-off element presents a body in which at least one valve is disposed, and a downstream end includes an exit port to which the downstream functional element is operatively connected. At least one of the upstream shut-off element and the downstream functional element includes a retention mechanism for the flow-rate limiter. A unit including the downstream functional element is directly connected to the upstream shut-off element containing in its interior the flow-rate limiter.

28 Claims, 2 Drawing Sheets

U.S. PATENT DOCUMENTS

| | | | |
|---|---|---|---|
| 5,020,568 A * | 6/1991 | Taylor | 137/316 |
| 5,251,653 A * | 10/1993 | Tucker et al. | 137/460 |
| 5,271,427 A * | 12/1993 | Berchem | 137/375 |
| 5,533,549 A * | 7/1996 | Sherman | 137/557 |
| 5,667,366 A * | 9/1997 | Reef et al. | 417/198 |
| 6,305,620 B1 * | 10/2001 | Marchese | 239/587.1 |
| 2001/0032958 A1 * | 10/2001 | Artsvelyan | 251/331 |
| 2005/0077381 A1 * | 4/2005 | Combs | 239/273 |
| 2005/0145727 A1 * | 7/2005 | Steingass et al. | 239/587.2 |
| 2006/0086399 A1 * | 4/2006 | Bailey | 138/45 |
| 2006/0118751 A1 | 6/2006 | Lodolo | |
| 2006/0284420 A1 * | 12/2006 | Dole | 285/367 |

FOREIGN PATENT DOCUMENTS

| | | |
|---|---|---|
| FR | 2 340 023 | 8/1977 |
| WO | 2004 005778 | 1/2004 |

* cited by examiner ns to a multifunctional fluid shut-off device in accordance with the introduction to the main claim.

MULTIFUNCTIONAL SHUT-OFF DEVICE

The present invention relates to a multifunctional fluid shut-off device in accordance with the introduction to the main claim.

In state-of-the-art water dispensing, for example for agricultural uses, a shut-off device, for example a valve, and a flow-rate limiter to ensure that the water delivered to a pipe branch does not exceed a certain predetermined value and hence subtract it from other users, are connected in series to a delivery nozzle. WO 2004/005778 discloses a diaphragm valve which can be used as shut-off device. A meter is often positioned before the valve to meter the water delivered to each user. To simplify assembly, devices known as water meters are available comprising a meter in series with a valve which are disposed in a single body. The flow-rate limiting device comprises a rigid pipe flanged at its ends, with an internal flow-rate limiter comprising a venturi conduit with a throat of flexible material (normally rubber) which, as the velocity of the fluid flowing therethrough increases, contracts due to the pressure reduction within the throat section. This contraction determines a reduction in the passage cross-section to hence limit the flow rate, which cannot exceed a predetermined value. This flow-rate limiting device is sealedly inserted between the valve and a downstream operational element, normally a delivery nozzle with a ball joint, this nozzle being flanged at its upstream end.

To mount a separate water meter and flow-rate limiting device in a pipe and then add a delivery nozzle downstream thereof is rather laborious, as all these elements are flanged and have to be connected together with gaskets interposed therebetween to ensure a seal. To simply combine a water meter and flow-rate limiting device within a single body would result in a longer and therefore heavier body weighing more than 30 kg, which would be difficult to handle and on the basis of current regulations would require the simultaneous presence of two operators, with consequent higher costs.

Another problem is the difficulty of delivering the water in different directions, achieved by bending a flexible pipe connected to the delivery nozzle, this being difficult if the pipe diameter and the water flow rate through it are large.

Moreover a series combination of a water meter or simple valve, a flow-rate limiter and a delivery nozzle is easily subject to tampering by users who by inserting a stick through the delivery nozzle can break the flow-rate limiter and hence obtain an illegal advantage.

An object of the invention is therefore to provide a device which enables the stated drawbacks to be overcome, a particular object being to achieve simpler assembly.

Another object is to obtain a light-weight device in the whole, having therefore lower production and transportation costs.

Another object is to facilitate water delivery in different directions. Another object is to make tampering of the flow-rate limiter difficult. Said objects are attained by a device the inventive characteristics of which are defined by the claims.

The invention will be more apparent from the ensuing detailed description of one embodiment thereof, given by way of non-limiting example and illustrated in the accompanying drawings, in which.

Figure 1:
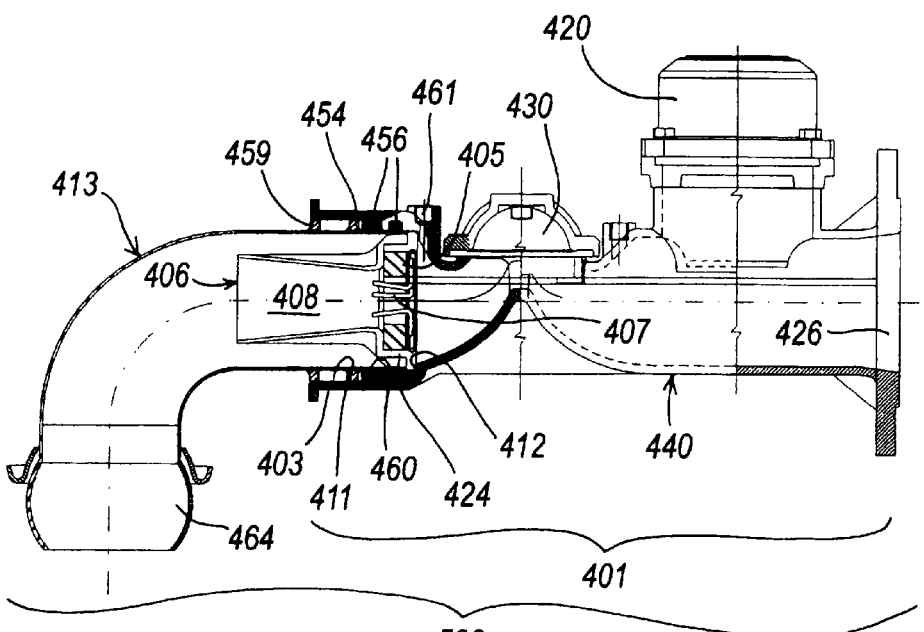
FIG. 1 is a side view of the multifunctional shut-off device, shown partly in longitudinal section, and comprising an upstream shut-off element joined to a delivery nozzle.
Figure 2:
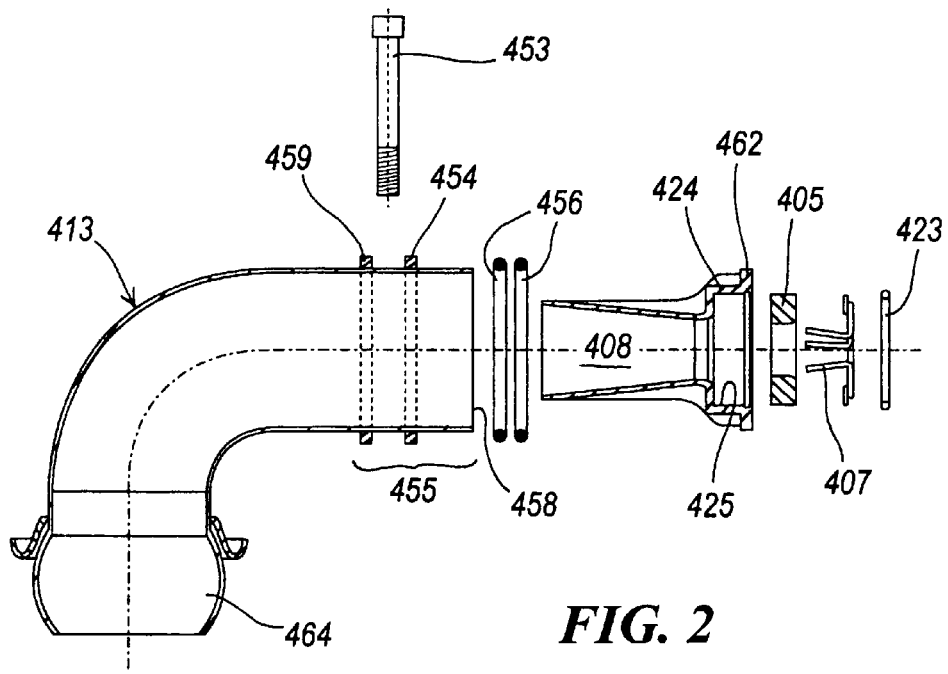
FIG. 2 is an exploded sectional view of the delivery nozzle and flow-rate limiter.

With reference to the figures, the device of the invention, called hereinafter a multifunctional shut-off device 500, comprises in its preferred embodiment an upstream shut-off element 401, operationally connected to a downstream functional element 413, and a flow-rate limiter 406 which lies inside the combination of these two directly coupled elements. The upstream shut-off element comprises a body 440 in which a meter 420 and a valve 430 are disposed in series, said body 440 presenting an entry port 426 and an exit port 403 with an interior exit housing 411, on the bottom of which a seat 412 is provided to receive the base of a flow-rate limiter 406. The flow-rate limiter 406 is normally composed of a flexible throat 405 of rubbery material, a divergent portion 408 normally of rigid material and a cage 407 to halt the deformation of the flexible throat 405. The base 424 of said divergent portion 408 presents a base housing 425 facing upstream to at least partially receive the flexible throat 405. Externally, the base 424 of the divergent portion 408 presents a projecting edge 462 acting as an element by which the flow-rate limiter 406 is retained, preventing it from escaping downstream. In FIGS. 1 and 2 it can be seen that in the proposed embodiment this base housing 425 completely receives the flexible throat 405, to its upstream end there being fixed the peripheral ring 423 by which the various components of the flow-rate limiter 406 are fixed together.

The seat 412 acts as a retention means for the flow-rate limiter 406, as it restrains its upstream and translational movement, with the exception of translation in an axial direction downstream. Other retention means could also be provided to secure or lock the flow-rate limiter 406 to the exit port 403, for example an elastic ring to be inserted into a suitable annular groove or a thread to engage a holed and threaded cover which grips the base of the flow-rate limiter 406 and from which the divergent portion of the flow-rate limiter 406 emerges. The term "direct retention means" signifies means provided specifically to retain the flow-rate limiter, for example a particular conformation such as a housing, a seat or a thread, or separable means provided specifically to perhaps only partially but always directly restrain the movements of the flow-rate limiter, such as an elastic ring or a screw. Said direct retention means can secure the flow-rate limiter either to the upstream shut-off element 401 or to the downstream functional element or to both.

The "downstream functional element" is any element, directly connectable operatively to the downstream end of the shut-off element 401, which has a certain function, not merely that of retaining the flow-rate limiter, such as a delivery nozzle function.

A connection member comprising gripping elements 451, 452, 453 and respective gripping counter-elements 454 enables the downstream functional element to be securely connected to the exit port 403 of the upstream shut-off element. In the embodiment shown in the figures, this downstream functional element is a delivery nozzle 413 with a ball joint 464 at its downstream end. This delivery nozzle 413 is curved to facilitate dispensing in a determined direction. The connection member enables the downstream functional element 413 to be rotated about the upstream shut-off element 401. The delivery nozzle also presents an upstream portion 455 to penetrate into the exit housing 411, a counteracting collar 454 being disposed on said upstream portion 455 to act as a gripping counter-element. The upstream portion 455 of the delivery nozzle 413 terminates with an upstream end 458 which rests against the projecting edge 462 of the base of the flow-rate limiter 406 to retain it. This upstream end 458 can also press the flow-rate limiter 406 into its seat 412, to lock it.

The flow-rate limiter 406 is disposed inside the unit formed from the delivery nozzle 413 and the upstream shut-off element 401, these being operatively connected together in such a manner as to enable them to rotate relatively. The flow-rate limiter 406 is hence inside the multifunctional shut-off device 500. The direct retention means for the flow-rate limiter 406, such as the seat 412 which receives it, are inside the shut-off element 401, and more generally are inside the unit formed from the downstream functional element 413 and the upstream shut-off element 401 directly connected operatively thereto.

The gripping element comprises two tangential holes (in FIG. 3 only the hole 451 can be seen) provided close to the exit port 403 of the upstream shut-off element 401 and arranged to receive two fixing pins 452, 453, which in the example are two fixing bolts 452, 453 threaded at their end, to be screwed into the tangential holes.

Figure 4:
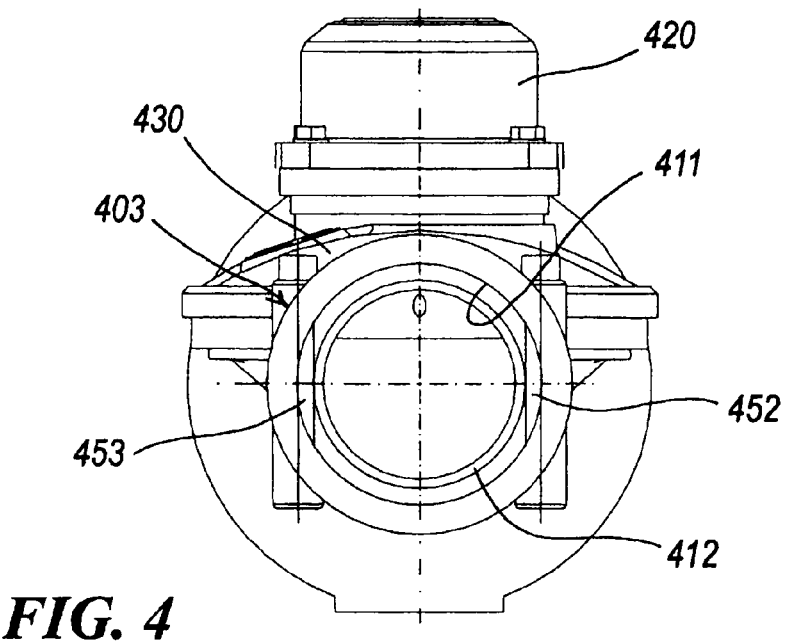
FIG. 4 is a view from the downstream end of the shut-off element without the flow-rate limiter.

With reference to FIG. 4, it can be seen that the side surface of these fixing pins 452, 453 laterally extends into the exit housing 411, to generate an interference with the counteracting collar 454 located upstream.

The gripping counter-elements comprise a counteracting collar 454 disposed on the outer surface of the upstream portion 455 of the delivery nozzle 413, which penetrates into the exit housing 411 of the multifunctional meter. This stop collar 454 acts as a contacting surface for the side surfaces of the two fixing bolts 452, 453. The presence of the two fixing bolts 452, 453 and of the counteracting collar 454 prevents axial translation of the delivery nozzle 413 while at the same time enabling it to rotate, so that the downstream end of the delivery nozzle 413 can be easily orientated in the required direction. Two O-rings 456 forming a seal element are housed in two suitable grooves 460 inside the exit housing 411, upstream of said counteracting collar 454, so that they surround the upstream portion 455, to tightly seal it.

Figure 3:
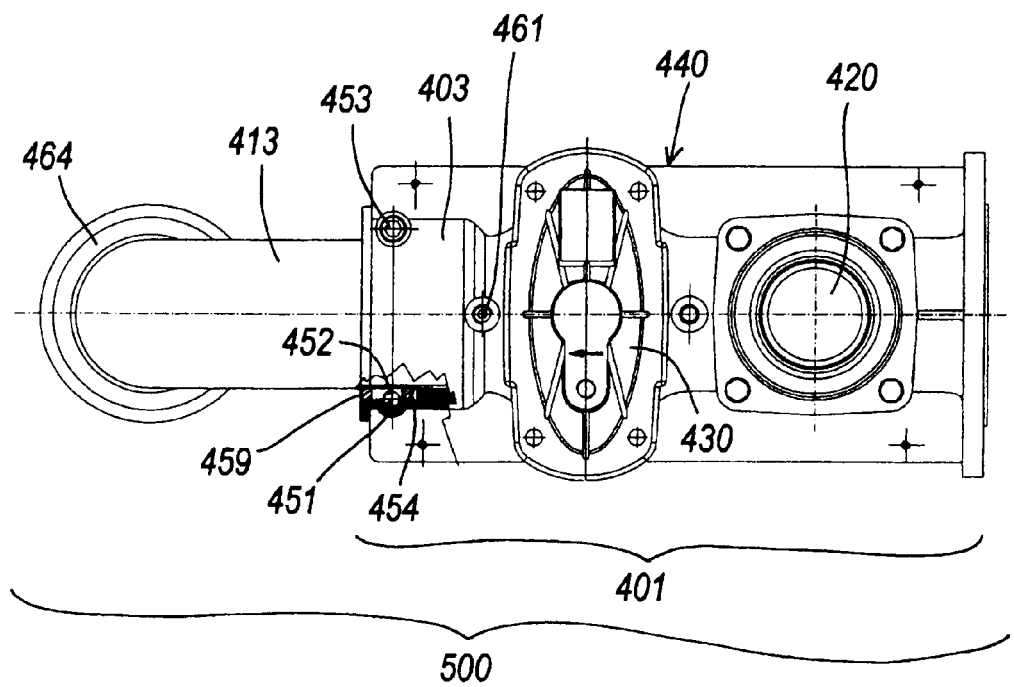
FIG. 3 is a view of the invention from above.

A second collar, known as the stabilizer collar 459, is present on the outer surface of the upstream portion 455 of the delivery nozzle 413 but spaced from the counteracting collar 454, to provide a supplementary support surface for opposing the bending moments which act on the delivery nozzle 413. The counteracting collar 454 and the stabilizer collar 459 are sufficiently spaced apart to enable the fixing bolts 452 and 453 to pass between them. FIGS. 1 and 3 also show a connector 461 for a pressure gauge, disposed downstream of the valve 430 but upstream of the delivery nozzle 413.

The multifunctional shut-off device 500 is installed by connecting the entry port 426 of the upstream shut-off element 401 to the pipe the fluid through which is to be shut off. The two O-rings 456 are disposed in their respective grooves 460 within the exit housing 411. The flow-rate limiter 406 is inserted into its seat 412. The downstream functional element 413 is brought into contact with the exit port 403 of the upstream shut-off element 401. The upstream portion 455 of the downstream functional element 413 is inserted into the exit housing 411 until both the counteracting collar 454 and the stabilizer collar 459 enter the exit housing 411. On inserting the upstream portion 455 into the exit housing 411, the projecting edge 462 of the flow-rate limiter 406 interferes with the upstream end 458 of the downstream functional element 413, to hence retain the flow-rate limiter.

The fixing bolts 452, 453 are inserted into the tangential holes 451 and tightened down, said counteracting collar 454 being located immediately upstream of the fixing bolts, such that the downstream functional element 413 is prevented from withdrawing. The fixing bolts 452 and 453 enable the delivery nozzle 413 to be rotated, to hence be more easily orientated for delivering the water or more generally the fluid in the required direction.

The multifunctional shut-off device 500 is normally positioned with its axis vertical, so that the delivery nozzle 413, curved to form an angle of 90°, directs the exit fluid in a horizontal direction. The delivery nozzle can hence be easily orientated in the direction chosen by the final user.

In FIG. 3 it can be clearly seen that the valve 430 used in the example is of elliptical port type, such as that of WO 2004/005778 A1. This reduces the overall axial length and the total weight of the multifunctional shut-off device. Any other valve can evidently be used. The meter 420 used is preferably of tangential type, with an impeller which penetrates only partially into the fluid, and with its axis of rotation perpendicular to the direction in which the fluid flows. Any meter can be used.

The fluid, for example water for irrigation use, enters the body 440 from the entry port 426, passes through the meter 420 and then through the valve 430. If the valve is open, the water passes through the flow-rate limiter 406 and proceeds to the delivery nozzle 413, and from there for example to an irrigation hose.

By presenting a convergent divergent conduit, the flow-rate limiter 406 produces a vacuum in the throat section by the venturi effect. This vacuum is greater the higher the fluid velocity. By the effect of this vacuum, the flexible throat 405 contracts to hence limit the fluid flow rate. The cage 407 prevents the flexible throat 405 from contacting too much and hence being sucked downstream. The cage 407 does not have to be closed, it being sufficient that it prevents contraction of the flexible throat beyond a certain limit. The flow-rate limiter could also be formed in an different manner, for example without comprising the cage 407 but instead comprising a metal disc moulded into the rubber.

In the irrigation sector the downstream functional element is nearly always a delivery nozzle 413 with a ball joint at its downstream end. This downstream functional element is also known simply as a ball joint.

The upstream shut-off element could possibly also not comprise a meter but only a valve.

As an alternative to the described embodiment, the direct retention means for the flow-rate limiter could be disposed on the delivery nozzle instead of on the upstream shut-off element 401. For example, the delivery nozzle could comprise a seat for the base of the flow-rate limiter to restrain it from flowing downstream. For example a seat for the base of the flow-rate limiter could be made in the upstream portion of the delivery nozzle. The delivery nozzle could also present a housing to receive not only the seat for the flow-rate limiter but also the exit port of the body of the upstream shut-off element, so essentially inverting the initially described embodiment.

Hence at least one from said upstream shut-off element 401 and said downstream functional element 413 must comprise direct retention means for a flow-rate limiter 406, which is disposed in the interior of the unit consisting of the downstream functional element 413 directly connected operatively to the upstream shut-off element 401.

The present patent also protects a delivery nozzle to be connected operatively to the exit port 403 of an upstream fluid shut-off element 401 and comprising direct retention means for a flow-rate limiter 406, such as a seat, to receive the base of a flow-rate limiter and to retain it by preventing it from sliding downstream, said flow-rate limiter being hence at least partially internal to the delivery nozzle and in any event internal to the combined delivery nozzle and upstream shut-off element when operatively connected together. In the most common case, said direct retention means are also inside the delivery nozzle. The delivery nozzle protected by the patent is rotatably connectable to the exit port 403 of an upstream shut-off element 401 such as that already described. This rotatable connection is made by gripping counter-elements such as a counteracting collar 454.

Advantageously said delivery nozzle is curved and presents a ball joint at its downstream end.

The present patent also protects an individual upstream shut-off element 401 comprising a body 440 in which at least one valve 430 is disposed, said body 440 presenting a downstream end provided with an exit port 403 to be operatively connected to a downstream functional element 413, said upstream shut-off element 401 further comprising direct retention means 412 for a flow-rate limiter 406, said direct retention means 412 being arranged to retain the flow-rate limiter 406 such that it lies at least partially within said upstream shut-off element 401. Normally said direct retention means are also internal to the upstream shut-off element 401. The body 440 can also hold a meter 420 connected in series with the valve 430. Advantageously the meter is of tangential type and the valve of elliptical port type.

As the multifunctional shut-off device 500 comprises a meter, a valve, a flow-rate limiter and a delivery nozzle all contained within a single device, with an outer body formed by joining only two pieces together, assembly is extremely simplified, with lower labour cost.

As the flow-rate limiter 406 is inside the multifunctional shut-off device 500, the unit is particularly compact and lightweight, and hence with a lower production, transport and assembly cost.

An advantageous characteristic of the invention is that the orientatable curved delivery nozzle 413 allows more comfortable use while at the same time protecting the flow-rate limiter 406 from tampering.

The invention claimed is:

1. A multifunctional fluid shut-off device comprising:
   an upstream shut-off element including
   a body in which at least one valve is disposed, and
   a downstream end having an exit port;
   a flow-rate limiter;
   a delivery nozzle that is operatively connected to the exit port of the upstream shut-off element; and
   a connection member including gripping elements and respective gripping counter-elements arranged tangentially to said upstream shut off element and said delivery nozzle and insertable through said exit port via which the delivery nozzle is connected to the exit port of the upstream shut-off element such that the delivery nozzle is continuously rotatable with respect to the upstream shut-off element without disconnecting therefrom;
   wherein at least one of the upstream shut-off element and the delivery nozzle includes retention means for the flow-rate limiter, and
   wherein the delivery nozzle is directly connected to the upstream shut-off element and contains in an interior thereof the flow-rate limiter.

2. A multifunctional shut-off device as claimed in claim 1, wherein the retention means includes direct retention means configured to retain the flow-rate limiter in a direct manner.

3. A multifunctional shut-off device as claimed in claim 2, wherein the direct retention means is located where the delivery nozzle is directly connected operatively to the upstream shut-off element.

4. A multifunctional shut-off device as claimed in claim 1, wherein the delivery nozzle includes a ball joint at a downstream end thereof.

5. A multifunctional shut-off device as claimed in claim 1, wherein the delivery nozzle is curved.

6. A multifunctional shut-off device as claimed in claim 1, wherein the flow-rate limiter is retained in position by the delivery nozzle operatively connected to the upstream shut-off element.

7. A multifunctional shut-off device as claimed in claim 2, wherein the direct retention means comprises a seat disposed in the exit port of the upstream shut-off element to at least partially house the flow-rate limiter.

8. A multifunctional shut-off device as claimed in claim 2, wherein the direct retention means comprises a seat disposed in the delivery nozzle to at least partially contain and retain the flow-rate limiter.

9. A multifunctional shut-off device as claimed in claim 1, wherein an upstream portion of the delivery nozzle is inserted into an exit housing in the exit port of the upstream shut-off element.

10. A multifunctional shut-off device as claimed in claim 9, wherein the exit housing comprises a seal element.

11. A multifunctional shut-off device as claimed in claim 1, wherein the gripping elements comprise at least one tangential hole in which a fixing pin is disposed.

12. A multifunctional shut-off device as claimed in claim 11, wherein the fixing pin is a fixing bolt.

13. A multifunctional shut-off device as claimed in claim 1, wherein the gripping counter-elements comprise a stop collar disposed on an upstream portion of the delivery nozzle.

14. A multifunctional shut-off device as claimed in claim 13, further comprising a stabilizer collar disposed on the upstream portion of the delivery nozzle.

15. A multifunctional shut-off device as claimed in claim 1, wherein the flow-rate limiter comprises at least one flexible throat and a divergent portion, a base of the divergent portion including a base housing operatively facing upstream to at least partially receive the flexible throat.

16. A multifunctional shut-off device as claimed in claim 15, wherein the base housing of the divergent portion includes a projecting edge that interferes with the delivery nozzle to prevent downstream sliding of the flow-rate limiter.

17. A multifunctional shut-off device as claimed in claim 1, wherein within the body a meter is connected in series with the valve.

18. A delivery nozzle configured to operatively connect to an exit port of an upstream shut-off element, comprising:
    direct retention means to retain a flow-rate limiter such that the flow-rate limiter lies at least partially within the delivery nozzle; and
    gripping counter-elements that engage corresponding gripping elements of the upstream shut-off element, each of said gripping elements and gripping counter-elements arranged tangentially to said upstream shut off element and said delivery nozzle and insertable through said exit port, such that the delivery nozzle is secured to an exit port of the upstream shut-off element, the delivery nozzle being continuously rotatable with respect to the upstream shut-off element without disconnecting therefrom.

19. A delivery nozzle as claimed in claim 18, wherein the direct retention means is inside the delivery nozzle.

20. A delivery nozzle as claimed in claim 19, wherein the direct retention means comprises a seat for the flow-rate limiter so as to prevent the flow-rate limiter from sliding downstream.

21. A delivery nozzle as claimed in claim 18, wherein the gripping counter-elements comprise a stop collar disposed on an upstream portion of the delivery nozzle.

22. A delivery nozzle as claimed in claim 18, wherein the delivery nozzle is curved.

23. A delivery nozzle as claimed in claim 18, further comprising a ball joint at downstream end thereof.

24. An upstream shut-off element comprising:
a body on which at least one valve is disposed, the body including a downstream end having an exit port that is operatively connected to a delivery nozzle;
gripping elements that connect the delivery nozzle to the exit port of the upstream shut-off element, said gripping elements arranged tangentially to said upstream shut off element and said delivery nozzle and insertable through said exit port, the delivery nozzle being continuously rotatable with respect to the upstream shut-off element without disconnecting therefrom; and
direct retention means to retain a flow-rate limiter such that the flow-rate limiter lies inside the delivery nozzle directly connected to the upstream shut-off element.

25. An upstream shut-off element as claimed in claim 24, wherein the direct retention means retains the flow-rate limiter such that the flow-rate limiter lies at least partially inside the upstream shut-off element.

26. An upstream shut-off element as claimed in claim 24, wherein the direct retention means is inside the upstream shut-off element.

27. An upstream shut-off element as claimed in claim 24, wherein the direct retention means comprises a seat disposed in the exit port to at least partially house the flow-rate limiter.

28. An upstream shut-off element as claimed in claim 24, wherein the gripping elements comprise at least one tangential hole in which a fixing pin is disposed.

* * * * *